United States Patent [19]

Czuchajowska et al.

[11] Patent Number: 5,364,471
[45] Date of Patent: Nov. 15, 1994

[54] PROCESS FOR FRACTIONATING LEGUMES TO OBTAIN PURE STARCH AND A PROTEIN CONCENTRATE

[75] Inventors: Zuzanna Czuchajowska, Moscow, Id.; Yeshajahu Pomeranz, Pullman, Wash.

[73] Assignee: Washington State University Research Foundation, Pullman, Wash.

[21] Appl. No.: 108,040

[22] Filed: Aug. 17, 1993

[51] Int. Cl.$^5$ .................. C08B 30/00; B02B 5/00; B02B 3/12
[52] U.S. Cl. .................. 127/65; 127/66; 127/67; 241/7; 241/8; 241/9
[58] Field of Search ............. 241/7, 8, 9; 127/65, 127/66, 67

[56] References Cited

U.S. PATENT DOCUMENTS

| | | | |
|---|---|---|---|
| 4,060,203 | 11/1977 | Edwards et al. | 241/7 |
| 4,766,204 | 8/1988 | Nickel | 426/656 |
| 5,034,227 | 7/1991 | Nickel | 426/484 |

OTHER PUBLICATIONS

Kawamura, S. et al. (1955) "Studies on legume starches. I. Micro. observation on the granules of starches from some Jap. legumes" Tech. Bull. Kagawa Agr. Coll. 7:87–90. (ref. not available–abstract enclosed)* (month not available).

Kawamura, S., M. Tada (1958) "Legume starches. III. Separation and determination of amylose and amylopectin. I. Introduction and preliminary experiments with iodine coloration" Chem. Abstr. 52:20428h.

Deshpande, S. S. et al. (1990) "Food legumes: Chemistry and technology" Adv. in Cereal Science & Technol. Chap. 3 in vol. X–147–241 (relevant information only).*

Schoch, T. J., E. C. Maywald (1968) "Preparation and Properties of Various Legume Starches" Cereal Chem. 45:564–573, Mar. 15/May 15, 1968.

Haase, N. U. et al. (1987) "Gergleichende Untersuchungen zur Erbsenstärkeisolierung auf naβtechnischem Wege" Die Starke 39:416–421. *month not available.

Honigfort, T. (1988) "Versuche zur Gewinnung und Charakterisierung von Stärke aus Erbsen" M. Sc. Thesis. U. Berlin, Inst. Food Technol., Dept. Cereal Technology. Apr. 8, 1988.

Hoover, Ratnajothi et al. (1991) "Isolation and Characterization of Lima Bean (*Phaseolus lunatus*) Starch" J. Food Biochem. 15:117–136. Nov. 7, 1990–Mar. 6, 1991.

Vose, J. R. (1977) "Functional Characteristics of an Intermediate Amylose Starch from Smooth-seeded Field Peas compared with Corn and Wheat Starches" Cereal Chem. 54:1141–1151.*

Olsen, H. S. (1978) "Continuous Pilot Plant Production of Bean Protein by Extraction, Centrifugation, Ultrafiltration and Spray Drying" Lebensm.-Wiss. Technol. 11(2):57–64. Sep. 30, 1977.

Colonna, P. et al. (1980) "Pisum sativum and Vicia faba Carbohydrates: Studies of Fractions obtained after dry and wet protein extraction processes" J. Food Sci. 45:1629–1636.*

Ningsanod, S., B. Ooraikul (1989) "Chemical and Nutritional Properties of Dry and Wet Milling Products of Red Cowpeas" Can. Inst. Food Sci. Technol. J. 22:147–155.*

*Primary Examiner*—Paul Lieberman
*Assistant Examiner*—Patricia L. Hailey
*Attorney, Agent, or Firm*—Saliwanchik & Saliwanchik

[57] ABSTRACT

The subject invention provides, for the first time, an efficient method for obtaining high quality essentially pure starch from legumes. The method involves milling dehulled legumes to obtain a powder followed by wet separating (centrifugation) the small particle size fraction of said powder to separate pure starch from a protein concentrate. The invention is specifically exemplified with respect to garbanzo beans.

4 Claims, No Drawings

PROCESS FOR FRACTIONATING LEGUMES TO OBTAIN PURE STARCH AND A PROTEIN CONCENTRATE

This invention was made with government support under Agreement Nos. 88-33574-4054 and 89-33574-4275 from the United States Department of Agriculture. The government has certain rights in this invention.

BACKGROUND OF THE INVENTION

Starch ($C_6H_{10}O_5)_x$ is available from a variety of natural sources including most cereal grains, tubers, roots, and other plant parts. Starch can be used in a wide variety of applications ranging from adhesives to major food ingredients or critical food functional additives. The current invention is primarily directed to an efficient method of obtaining essentially pure starch, along with a protein concentrate, with excellent qualities for food preparation.

The starch content of legumes ranges from 35 to 60% of the dry weight of the beans. Legume starches have been identified as a new and exciting food ingredient. For example, pea starch has been used widely in the processed meat industry where heat and mechanical stability are of great interest. In canned foods, cooked sausages, patés, and other foods, pea starch can substitute for traditional starches with excellent results. As a thickening agent in soups and sauces and in many other products, pea starch gives a pleasant mouth feel. Heat stability, excellent expansion properties and marked resistance to mechanical shear are important in extruded products. Until now, the main limitation of the use of pea starch in foods is the relatively high cost of its isolation.

Most legume starch isolation methods are lengthy, laborious, and costly. Techniques for the isolation of legume starches were originally reported by Kawamura et al. (Kawamura, S., Y. Tuboi, T. Huzii [1955] "Studies on legume starches. I. Microscopic observation on the granules of starches from some Japanese legumes," *Tech. Bull. Kagawa Agr. Coll.* 7:87–90) and Kawamura et al. (Kawamura, S., M. Tada [1958] "Legume starches. III. Separation and determination of amylose and amylopectin. I. Introduction and preliminary experiments with iodine coloration," *Chem. Abstr.* 52:20428h). The Kawamura method involves treatment of a legume preparation with a 0.2% NaOH solution, washing with water, and dehydration with ethanol and water. See also Deshpande, S. S., S. Damodaran (1990) "Food legumes: Chemistry and technology," Chapter 3 In, Vol. X, *Adv. Cereal Science & Technol.* (Y. Pomeranz, editor) Am. Assoc. Cereal Chem., St. Paul Minn., pp. 147–241). The procedures most widely used today are three methods developed by Schoch et al. (Schoch, T. J., E. C. Maywald [1968] "Preparation and properties of various legume starches," *Cereal Chem.* 45:564–573), who identified certain conditions for starch isolation from legumes. In the first method, which is used for mung beans, garbanzo beans, and dehulled split yellow peas, starch can be obtained by initially steeping legume seeds in warm water in the presence of toluene to prevent fermentation. This initial steeping is followed by wet grinding and repeated screening. A second methods exists for lentils, lima beans, and white navy beans. The initial steps of the second method are similar to the first method but the second method further involves resuspension in a 0.2% NaOH solution (to dissolve most of the protein) and several tabling steps. The third method (for wrinkled seeded peas) requires exhaustive alkaline steeping and washings of the isolated starch.

The separation of pure legume starch is difficult because of the presence of a highly hydrated fine fiber (cotyledon cell wall material) and strong adherence of large amounts of insoluble proteins. The above procedures, or modifications thereof, were used recently, among others, by Haase et al. (Haase, N. U., W. Kempf, G. Tegge, U. D'heur [1987] "Vergleichende Untersuchungen zur Erbenstärkeisolierung auf nasstechnischen Wege," *Die Starke* 39:416–421), Honingfort (Honingfort, T. [1988] "Versuche zur Gewinnung and Charakterisierung yon Stärke aus Erbsen, *M. Sc. Thesis.* U. Berlin, Inst. Food Technol., Dept. Cereal Technology.), and Hoover et al. (Hoover, R., S. C. Rorke, A. M. Martin [1991] "Isolation and characterization of lima bean *Phaseolus lunatus* starch," *J. Food Blochem.* 15:117–136). Vose (Vose, J. R. [1977] "Functional characterization of an intermediate amylose starch from smooth-seeded field peas compared with corn and wheat starches," *Cereal Chem.* 54:1141–1151) prepared pea starch by pin milling whole peas, air classification of the very fine flour, defibering the starch concentrate, washing and repeated centrifugation. Unfortunately, this procedure is very damaging to the starch. Therefore, to obtain a product with minimum starch damage, the Schoch et al. ([1968], supra) method is required. Olsen (Olsen, H. S. [1978] "Continuous pilot plant production of bean protein by extraction, centrifugation, ultrafiltration, and spray drying," *Lebensm.-Wiss. Technol.* 11(2):57–64) described a batch and continuous ultrafiltration method for isolation of fababean protein isolates. The process can be used to obtain pea starch as a by-product. Colonna et al. (Colonna, P., D. Gallant, C. Mercier [1980] "*Pisum sativum* and *Vicia faba* carbohydrates: Studies of fractions obtained after dry and wet protein extraction processes," *J. Food Sci.* 45:1629–1636) isolated by a wet process starches from air classified pea and fababean fractions. The isolation was not possible from starchy by-products probably due to their high hemicellulose content. Ningsanond et al. (Ningsanond, S., B. Ooraikul [1989] "Chemical and nutritional properties of dry and wet milling products of red cowpeas," *Can. Inst. Food Sci. Technol. J.* 22:147–155) describe wet and dry processes for fractionation of dehulled and milled cowpea seeds into protein-rich and starch-rich fractions. The dry process involves pin milling and air classification; the wet process involves wet milling of soaked whole seeds, alkaline extraction (pH 9), and acid-heat precipitation (pH 4.4 at 80°).

There has been particular interest in split and broken garbanzo beans since there is very little market for these products other than grinding them up and using them for animal feed. Splits or brokens are a by-product of marketing whole garbanzo beans. The price of the brokens is about 1/10 of that of the whole beans. Most of the brokens are incorporated into feeds.

Stone-milled garbanzo bean flour is commercially available. However, the flour is creamy in color with a wide variation of particle size. It does not hydrate well and thus is not good for incorporation into foods and instead is most often used for feed.

Currently, there is no efficient method for the isolation of highly pure starch from legumes.

BRIEF SUMMARY OF THE INVENTION

The subject invention pertains to a unique and efficient process for isolating starch from legumes. The process is particularly advantageous because it yields high quality starch having excellent characteristics for a variety of uses. The starch product according to the process of the current invention is essentially pure with very little protein or other impurities. Also, the starch obtained using the procedure of the subject invention is not damaged as it can be when previously known procedures are used.

In an initial step of the subject invention, dehulled legumes are made into a powder through an appropriate milling process. In a preferred embodiment of the subject invention, a stone mill is used which efficiently creates a powder from the legume bean. The powder obtained by milling the legumes is then sieved in order to separate the fine particles from the larger particles. Microscopic (scanning electron microscopy) examination showed that legume starch is concentrated in the fine powder fraction originating in the protein-low and fiber-low central part of the kernel obtained after milling and sieving. Of equal importance, the cell wall and the protein components which impede the separation of starch are concentrated in the larger particles which result from the milling process and originate in the peripheral parts of the kernel. Therefore, by sieving the milled legume powder according to the subject invention it is possible to effectively separate the starch from the other components with which it is otherwise associated. After the fine powder is obtained by sieving, further wet fractionation yields essentially pure starch.

In one embodiment of the subject invention, garbanzo beans are stone milled and sieved. The particles in the powder which pass through an 86 micron sieve are collected. This fraction is highest in starch and contains relatively little protein or cell wall material. The low concentration of cell wall material in the fine powder fraction makes it possible to recover highly purified starch. The starch in the fine powder is isolated via wet fractionation to obtain the essentially pure starch. Typically, over 40% of the total flour passes through the 86 micron sieve. This portion of the product has uniform particle size, a whiter color, is low in protein, low in fiber, and has a high starch content.

The starch obtained by utilizing the process of the subject invention has excellent characteristics for food uses including advantageous high temperature characteristics.

DETAILED DESCRIPTION OF THE INVENTION

The subject invention concerns the discovery of a particularly efficient process for obtaining essentially pure starch from legumes. As used in the current application, "legumes" refers to beans or peas obtained from legume plants. Legumes are well-known to those skilled in the art and include, but are not limited to, garbanzo beans, mung beans, yellow peas, lentils, lima beans, white navy beans, soy beans, peanuts, and wrinkled peas. The current invention is specifically exemplified with respect to garbanzo beans and has been also been applied to several types of peas (smooth and wrinkled, green and yellow). Because legumes have a variety of characteristics and differ, for example, in oil content, some modification of the standard procedures set forth herein may be needed to optimize the process for a particular legume. Using the teachings provided herein, a person of ordinary skill in the art could make the modifications necessary to optimize the process for a particular legume.

Of particular interest relative to the process of the subject invention is the use of "brokens" which are legumes which have been mechanically damaged in harvesting or initial transportation and processing. These mechanically damaged legumes have much lower value than undamaged legumes. This low value is almost exclusively attributable to aesthetic considerations (consumer preference) and is not related to any changes in the food value of the legume. Currently brokens are almost entirely used for animal feed. The subject invention makes it possible to efficiently obtain high quality starch from brokens which would otherwise be essentially a waste product.

Until now, there was no cost effective means for isolating starch from legumes. Using the process of the subject invention it is possible to produce pure starch legumes without great expense. The ability to produce pure starch from legumes is particularly surprising because of the makeup of legumes wherein proteins and other cell wall components are known to be difficult to separate from the desired starch. The starch component of the legume is primarily found in the internal spaces of the legume and is surrounded by cell wall components and is held tightly within a protein matrix.

An efficient way to isolate pure starch from legumes is desirable not only because of the supply of relatively inexpensive brokens as a source material but also because of the highly desirable characteristics of legume starch. In particular, this starch has excellent high temperature characteristics which make it advantageous for use in a variety of foods. Incorporation of the starch obtained by our process also improves the shelf life for items such as bread and cakes; it holds its shape and does not stale readily. Legume starch can also enhance the mouth feel of various products, such as Oriental noodles. The appropriate use of legume starch is readily carried out by the skilled artisan. The current invention provides an efficient means for providing quantities of essentially pure legume starch.

The subject invention comprises the steps of 1) milling a dehulled legume (dehulled prior to milling or as part of the milling process) to produce a powder, 2) sieving the powder to separate fine particles from coarse particles, and 3) further processing the fine particles to obtain essentially pure starch.

As discussed above, the legume used as the source material can be chosen by a person skilled in the art depending upon what is available and what characteristics are desired in the starch which is to be isolated. The subject invention is specifically exemplified with respect to garbanzo beans. Other legumes can be used with appropriate modifications to the process.

The milling step of the process can be carried out using any one of a number of apparatuses and milling procedures. The subject invention is specifically exemplified with the use of a stone mill (for garbanzo beans) or a roller mill (for peas). Other milling machines and procedures can be used according to the subject invention so long as the powder which is produced has essentially the same characteristics as that which is produced using the stone mill or roller mill as described in the subject invention. Specifically, the primary requirement of the milling process is that it reduce the starch-rich particles to a size which is sufficiently less than the size of the protein-rich particles so that these two classes of particles can be separated without unduly pulverizing the particles rich in protein and cell wall material from the peripheral part of the kernel's endosperm. In addition to reducing various parts of the garbanzo cotyledon to various sizes that can be separated mechanically in a dry system, optimum grinding should also free the starch in the central endosperm from the protein matrix and cell wall material. The specific setting of the mill will vary somewhat with the kernel moisture, cleanliness, soundness, hardness, history, variety, and gross composition of the legume. Hulls constitute about 4 to 12% of most legumes. Garbanzo beans contained 5% hulls, most of which can be separated easily from broken-chips.

The yields of dehulled, ground and sieved brokens are given in Table 1.

TABLE 1

Yields of sieved fractions[a]

| Fraction | Yield (%) | | |
|---|---|---|---|
| | Range | Mean | Standard deviation |
| Above 230 μm | 34.6–35.4 | 35.1 | 0.38 |
| Between 86 and 230 μm | 23.2–23.7 | 23.4 | 0.24 |
| Below 86 μm | 41.4–41.7 | 41.6 | 0.15 |

[a]Four replicates

The separation step of the process of the subject invention can be conveniently carried out using a sieve with openings of appropriate size. For example, as exemplified herein, the starch-rich powder produced by stone mill processing of garbanzo beans will pass through an 86 μm sieve. The skilled artisan will appreciate that an exactly 86 μm sieve is not a critical limitation of the subject invention. For example, a sieve ranging from about 50 μm to about 150 μm could be used to effect the desired separation. Furthermore, separation techniques other than sieving could be used. For example, particles of different sizes may also be separated based on differential sedimentation, flotation, or other separation rates.

Following the separation step, the fine particles can be further processed to obtain the essentially pure starch and a protein concentrate. In a preferred embodiment of the subject invention, thus further processing can involve wet fractionation.

The white, tasteless, odor-free starch produced according to the subject invention has a number of advantages including:

(a) use of this starch lowers the glycemic index of foods;

(b) the starch has unique gelatinization properties (no breakdown at elevated temperatures); consequently, the starch can be used at a reduced concentration to lower the caloric content in soups, gravies, and the like;

(c) the starch has been found by us to prevent textural staling (compressibility) and shrinkage in a variety of baked products; and (d) the starch has a potential use in non-food products (such as degradable plastics), due to its mechanical strength and low granule size.

Following are examples which illustrate procedures, including the best mode, for practicing the invention. These examples should not be constructed as limiting. All percentages are by weight and all solvent mixture proportions are by volume unless otherwise noted.

Example 1 - Protocol for the Isolation of Pure Starch from Garbanzo Beans

Commercially available split or broken garbanzo beans were commercially stone milled and the hulls were separated by conventional methods (air and sieve). Peas (smooth and wrinkled, green and yellow) were dehulled during milling on a Bühler flour mill.

The stone milled powder was then separated by simple sieving into three fractions: (a) passing a 86 μm sieve, (b) retained on a 86 μm sieve, and (c) retained on a 230 μm sieve. The sieved fractions differed in protein contents by about 5% (lowest in the below 86 μm fraction). The fraction which passed through the 86 μm sieve contained about 9% moisture, 17–20% protein, and <6% oil. Composition of typical products (hulls, brokens, flours, and flour fractions) is summarized in Table 2.

TABLE 2

Composition[a] of garbanzo bean products

| | Protein (%) | Ash (%) | Free lipids (%) | Starch (%) | Fiber (%) |
|---|---|---|---|---|---|
| Product | | | | | |
| Commercial huffs | 8.13 | 6.49 | 0.91 | 14.07 | 69.50 |
| Commercially, partially dehulled garbanzo bean chips (broken) | 23.18 | 3.30 | 6.09 | 49.16 | 17.27 |
| Commercial[b] flour - as is | 23.55 | 3.20 | 6.31 | 50.63 | 15.31 |
| Fractions of commercial flour | | | | | |
| >230 microns | 24.84 | 3.56 | 6.12 | 44.74 | 19.74 |
| >86 microns | 25.81 | 3.35 | 7.05 | 46.78 | 15.98 |
| <86 microns | 21.22 | 2.79 | 5.80 | 57.03 | 11.98 |

[a]Moisture free basis
[b]Stone milled

The below 86 μm fraction was then wet separated into a high protein concentrate, pure starch, and tailings. The selection of the below 86 μm fraction is based on the fact that it is lowest in total and adhering protein and that the cotyledon cell wall material is relatively low in this fraction. The wet fractionation procedure was carried out as follows:

I. A slurry of 200 g of the below 86 μm sieved fraction was prepared by mixing the powder with 500 ml water in a blender for 3 minutes; the slurry was then centrifuged at about 1500 g for 15 minutes;

II. The top solubles were decanted; the solid layer was resumed in a blender for 3 minutes with 500 ml water; the slurry was centrifuged again as above;

III. Repeat step II once more; IV. Decant solubles and remove clearly separated tailings starch (below the solubles) from the bottom pure starch. The proteins are contained in the soluble fraction(s).

If desired, the amounts of water can be reduced in the second and third washings; the decanted solutions from second and third washings are low in solubles and can be recirculated for washing new lots of the original <86 μm flour.

We obtained the following yields of products:

| Prime starch | at least 40% |
|---|---|
| Tailings | 12–14% |
| Water solubles (mainly proteins and minerals) | About 40% |

The pure starch was obtained with a 40% yield and had only 0.5% protein. More detailed data on the composition of products from two fractionation experiments are described in Table 3.

TABLE 3

Composition[a] of products of two wet fractionations of garbanzo bean <86 μm flour

| | Fractionation I | | Fractionation II | | | |
|---|---|---|---|---|---|---|
| | Yield | Protein | Yield | Protein | Ash | Free Lipids |
| Product | | | | | | |
| Starch layer | 42.18 | 0.48 | 40.40 | 0.36 | 0.09 | 0.20 |
| Tailings layer | 12.98 | 8.96 | 12.45 | 8.09 | 1.33 | 0.58 |
| Water Solubles Fraction | | | | | | |
| 1 | 23.09 | 53.03 | 27.44 | 44.26 | — | 6.44 |
| 2 | 10.32 | 56.92 | 10.04 | 49.84 | — | 2.83 |
| 3 | 2.90 | 57.51 | 3.82 | 61.05 | — | 1.73 |

[a] %, moisture-free basis

The low-protein fraction yielded prime starch with a differential scanning calorimetry (DSC) single peak (indicative of purity) that has a high enthalpy (of importance in thermal processing). The compositional and DSC parameters were confirmed in hand dissected tissues (hull, cotyledon, and germ). The <86 μm flour fraction and the starch improved functional end use properties in breadmaking, cake making, and Oriental noodles.

Example 2 - Other Legume Sources

A similar, modified process can be used for roller-milled pea flour (reduction rolls). The system is applicable to smooth peas (yellow and green) and to wrinkled peas. In those studies, a so-called middlings flour (first, second, and third reduction flours, low in fiber) from roller milling on a Bühler laboratory mill were used.

In wet fractionation of pea flours, especially from highly colored legumes, it is preferable to separate (after removing the water solubles) the two insoluble parts (prime starch on the bottom, and tailings which are just above the prime starch). The prime starch and tailings are then each purified, by additional washings and centrifugation. The yields, protein and ash contents of the prime starch, tailings starch, and three protein concentrates for each of the three pea types are given in Table 4.

TABLE 4

Yields, protein, and ash in reduction flours from three pea types and in starch, tailings, and solubles

| | Smooth Peas | | Wrinkled Peas |
|---|---|---|---|
| | cv. Alaska (green) | cv. Latah (yellow) | cv. Scout |
| Reduction Flours | | | |
| Total yield (%) | 54.7 | 60.3 | 60.1 |
| Protein (%) | 23.4 | 34.4 | 28.1 |
| Prime Starch | | | |
| Yield (%) | 38.6 | 32.8 | 34.4 |
| Protein (%) | 0.61 | 0.89 | 1.63 |
| Ash (%) | 0.05 | 0.12 | 0.25 |
| Tailings | | | |
| Yield (%) | 21.2 | 19.4 | 17.8 |
| Protein (%) | 3.45 | 6.61 | 8.82 |
| Ash (%) | 1.06 | 0.92 | 1.04 |
| Water solubles | | | |
| Yield (%)[a] | 27.2; 10.7; 2.4 | 34.4; 10.8; 2.5 | 27.4; 16.1; 4.2 |
| Protein (%)[a] | 63.3; 58.8; 55.4 | 70.9; 69.2; 64.1 | 50.7; 53.8; 57.2 |
| Ash (%)[a] | 6.55; 7.10; 7.10 | 5.77; 6.48; 6.60 | 5.59; 6.26; 4.08 |

[a] In fractions 1, 2, and 3, respectively.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for obtaining essentially pure starch from legumes containing starch and protein, said method comprising:
    (a) milling a dehulled legume to produce a powder comprising particles of different sizes;
    (b) dry-separating the particles in the powder of step (a) to substantially separate the protein from the starch so as to obtain fine pulverized starch-rich particles (below about 86 μm) from the center of the cotyledon but not from an external layer of the kernel; and
    (c) wet-processing said fine pulverized starch-rich particles from the center of the cotyledon to obtain essentially pure starch.

2. The method, according to claim 1, wherein said milling is carried out with a stone mill or roller miller.

3. The method, according to claim 1, where said legume is a garbanzo bean, smooth peas, wrinkled peas, or other legumes.

4. The method, according to claim 1, wherein said wet processing of step c) comprises wet fractionation by centrifugation, or similar device.

* * * * *

UNITED STATES PATENT AND TRADEMARK OFFICE
CERTIFICATE OF CORRECTION

PATENT NO. : 5,364,471
DATED : November 15, 1994
INVENTOR(S) : Zuzanna Czuchajowska and Yeshajahu Pomeranz It is certified that error appears in the above-indentified patent and that said Letters Patent is hereby corrected as shown below:

Column 1, line 13: Delete "(Chd $6H_{10}O_5)_x$" and insert --$(C_6H_{10}O_5)_x$--.

Column 2, line 16: Delete "yon Stärke" and insert --von Stärke--.

Column 2, line 20: Delete "J. Food Blochem." and insert --J. Food Biochem.--.

Column 6, line 48: Delete "was resumed" and insert --was reslurried--.

Signed and Sealed this

Twenty-first Day of February, 1995

Attest:

BRUCE LEHMAN

*Attesting Officer*    *Commissioner of Patents and Trademarks*